US012327863B2

(12) United States Patent
Mason et al.

(10) Patent No.: US 12,327,863 B2
(45) Date of Patent: *Jun. 10, 2025

(54) ELECTROACTIVE MATERIALS FOR METAL-ION BATTERIES

(71) Applicant: Nexeon Limited, Abingdon (GB)

(72) Inventors: Charles Mason, Abingdon (GB); Chris Friend, Long Wittenham (GB); William Macklin, Abingdon (GB)

(73) Assignee: Nexeon Limited, Abingdon (GB)

( * ) Notice: Subject to any disclaimer, the term of this patent is extended or adjusted under 35 U.S.C. 154(b) by 632 days.

This patent is subject to a terminal disclaimer.

(21) Appl. No.: 17/612,751

(22) PCT Filed: May 20, 2020

(86) PCT No.: PCT/GB2020/051227
§ 371 (c)(1),
(2) Date: Nov. 19, 2021

(87) PCT Pub. No.: WO2020/234586
PCT Pub. Date: Nov. 26, 2020

(65) Prior Publication Data
US 2022/0246910 A1 Aug. 4, 2022

(30) Foreign Application Priority Data
May 20, 2019 (GB) ..................... 1907117

(51) Int. Cl.
| H01M 4/36 | (2006.01) |
| H01M 4/02 | (2006.01) |
| H01M 4/134 | (2010.01) |
| H01M 4/38 | (2006.01) |
| H01M 4/587 | (2010.01) |
| H01M 10/0525 | (2010.01) |

(52) U.S. Cl.
CPC ............ H01M 4/362 (2013.01); H01M 4/134 (2013.01); H01M 4/364 (2013.01); H01M 4/386 (2013.01); H01M 4/587 (2013.01); H01M 10/0525 (2013.01); H01M 2004/021 (2013.01); H01M 2004/027 (2013.01)

(58) Field of Classification Search
CPC ...... H01M 4/134; H01M 4/362; H01M 4/364; H01M 4/386; H01M 4/587; H01M 10/0525; H01M 2004/021
See application file for complete search history.

(56) References Cited

U.S. PATENT DOCUMENTS

| 10,424,786 B1 | 9/2019 | Mason |
| 10,508,335 B1 | 12/2019 | Mlmaz |
| 10,658,659 B1 | 5/2020 | Mason |
| 10,938,027 B2 | 3/2021 | Mason |
| 10,964,940 B1 | 3/2021 | Mason |
| 11,011,748 B2 | 5/2021 | Mason |
| 11,165,054 B2 | 11/2021 | Mason |
| 11,715,824 B2 * | 8/2023 | Mason ................. H01M 4/625 |
| | | 252/182.1 |
| 2012/0156493 A1 * | 6/2012 | Maisels ................. H01M 4/386 |
| | | 252/502 |
| 2014/0272592 A1 | 9/2014 | Thompkins et al. |
| 2021/0276875 A1 | 9/2021 | Mason |
| 2021/0351399 A1 | 11/2021 | Mason |

FOREIGN PATENT DOCUMENTS

| EP | 2060535 A1 | 5/2009 | |
| JP | 2003100284 A | 4/2003 | |
| JP | 2017195102 A | 10/2017 | |
| WO | 2007083155 A1 | 7/2007 | |
| WO | 2015152391 A1 | 10/2015 | |
| WO | 2017040299 A1 | 3/2017 | |
| WO | 2018046765 A2 | 3/2018 | |
| WO | 2018165610 A1 | 9/2018 | |
| WO | 2020095067 A1 | 5/2020 | |
| WO | WO-2020095066 A1 * | 5/2020 | .......... H01M 10/052 |
| WO | 2020128495 A1 | 6/2020 | |
| WO | 2020128523 A1 | 6/2020 | |

OTHER PUBLICATIONS

PCT International Search Report and Written Opinion, Application No. PCT/GB2020/051227, mailed Sep. 1, 2020, 11 pages.
Winter, M. et al., "Insertion Electrode Materials for Rechargeable Lithium Batteries", Adv. Mater., (1998), vol. 10, No. 10.
Ohara et al., Journal of Power Sources, (2004), vol. 136, pp. 303-306.
Guo et al., Journal of Materials Chemistry A, (2013), pp. 14075-14079.
Copending U.S. Appl. No. 17/517,013, filed Nov. 5, 2021.
Copending U.S. Appl. No. 17/217,266, filed Mar. 30, 2021.
Copending U.S. Appl. No. 17/416,671, filed Jun. 21, 2021.
Copending U.S. Appl. No. 17/416,162, filed Jun. 18, 2021.
Copending U.S. Appl. No. 17/292,262, filed May 7, 2021.
Copending U.S. Appl. No. 17/292,241, filed May 7, 2021.
Copending U.S. Appl. No. 17/316,908, filed May 11, 2021.

(Continued)

*Primary Examiner* — Gregg Cantelmo
(74) *Attorney, Agent, or Firm* — McDonnell Boehnen Hulbert & Berghoff LLP

(57) ABSTRACT

This invention relates to particulate electroactive materials consisting of a plurality of composite particles, wherein the composite particles comprise: (a) a porous carbon framework including micropores and mesopores having a total volume of 0.4 to 0.75 $cm^3/g$, wherein the micropore volume fraction is in the range of 0.5 to 0.85 based on the total volume of micropores and mesopores; and (b) silicon located at least within the micropores of the porous carbon framework in a defined amount relative to the volume of the micropores and mesopores.

17 Claims, No Drawings

(56) References Cited

OTHER PUBLICATIONS

ISO 15901-2:2022, "Pore size distribution and porosity of solid materials by mercury porosimetry and gas adsorption Part 2: Analysis of nanopores by gas adsorption," International Standards Organization (2022). Available at: https://iso.org/standard/67586.html.

ISO 15901-3:2007, "Pore size distribution and porosity of solid materials by mercury porosimetry and gas adsorption Part 3: Analysis of micropores by mercury porosimetry," International Standards Organization (2007). Available at: https://iso.org/standard/40364.html.

* cited by examiner

ELECTROACTIVE MATERIALS FOR METAL-ION BATTERIES

CROSS-REFERENCE TO RELATED APPLICATIONS

This application is a U.S. National Stage entry of International Patent Application no. PCT/GB2020/051227, filed May 20, 2020, which claims the benefit of priority of United Kingdom Patent Application no. 1907117.4, filed May 20, 2019.

BACKGROUND

Field

This invention relates in general to electroactive materials that are suitable for use in electrodes for rechargeable metal-ion batteries, and more specifically to particulate materials having high electrochemical capacities that are suitable for use as anode active materials in rechargeable metal-ion batteries.

Technical Background

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material which is capable of inserting and releasing metal ions during the charging and discharging of a battery. For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the use of silicon as an anode material is complicated by large volumetric changes on charging and discharging.

Intercalation of lithium into bulk silicon leads to a large increase in the volume of the silicon material, up to 400% of its original volume when silicon is lithiated to its maximum capacity, and repeated charge-discharge cycles cause significant mechanical stress in the silicon material, resulting in fracturing and delamination of the silicon anode material. Volume contraction of silicon particles upon delithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. The most widespread approach to address the irreversible capacity loss of silicon-containing anodes is to use some form of finely structured silicon as the electroactive material. It has been reported that fine silicon structures below around 150 nm in cross-section, such as silicon films and silicon nanoparticles are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased.

WO 2007/083155 discloses that improved capacity retention may be obtained through the use of silicon particles having high aspect ratio, i.e. the ratio of the largest dimension to the smallest dimension of the particle. The small cross-section of such particles reduces the structural stress on the material due to volumetric changes on charging and discharging. However, such particles may be difficult and costly to manufacture and can be fragile. In addition, high surface area may result in excessive SEI formation, resulting in excessive loss of capacity on the first charge-discharge cycle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. For instance, Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. SEI formation over the initial charging cycles is confined to the remaining pore volume such that the remaining silicon is not exposed to the electrolyte in subsequent charging cycles. It is shown that the composite material has improved capacity retention over multiple charging cycles, however the initial capacity of the composite material in mAh/g is significantly lower than for silicon nanoparticles.

JP 2003100284 discloses an active material comprising a carbon-based scaffold with small pores branching off from a few larger pores. An electroactive material (e.g. silicon) is indiscriminately located on the walls of both large and small pores and on the external surface of the carbon-based scaffold.

Silicon sub-oxide materials (e.g. $SiO_x$, wherein $0<x<2$) have been used in "hybrid" electrodes which comprise predominantly graphite as the active materials. However, due to expansion of the $SiO_x$ on lithiation and a relatively high irreversible lithium loss during the first charge cycle, the maximum loading of $SiO_x$ is typically around 10 wt % of the total electroactive materials in the electrode. Higher loadings of $SiO_x$ result in excessive electrode expansion and irreversible damage to the electrode. There is therefore a need for high capacity electrode materials which have comparable lithiation capacity to silicon oxides but reduced expansion and reduced capacity loss during the first charge cycle. This would allow the high capacity materials to be used in higher loadings than $SiO_x$ without increasing the total electrode expansion beyond the limit at which structural damage can occur.

The desirable expansion properties of electrode materials must be obtained alongside other important properties. In particular, a commercially-viable alternative electrode material needs to provide the benefit of high lithiation capacity alongside with high capacity retention over large numbers of charge-discharge cycles. In addition, it is important that any new electroactive material should be readily substitutable for known materials in conventional electrode fabrication processes. These processes typically rely on calendering of electrode materials onto current collectors in order to densify the electrode layers and to improve space utilisation within a battery design. Porous materials are vulnerable to fracturing during electrode fabrication, resulting in impaired electrochemical performance. It is therefore a particular requirement that new electrochemical materials should have sufficient structural strength alongside increased electrochemical storage capacity and reversible capacity retention.

SUMMARY

The inventors have determined that the mechanical performance of composite materials comprising a porous carbon framework and an electroactive material located within the porous carbon framework can be improved by using porous carbon frameworks with specific pore structures, a carefully controlled pore size distribution, and a controlled loading of electroactive material within the pores of the porous carbon framework. By locating the electroactive material within the carbon framework, the contact with electrolyte solvents in a cell is also reduced, minimizing chemical side-reactions which lead to irreversible lithium loss during the first and subsequent charging cycles.

In a first aspect, the invention provides a particulate material consisting of a plurality of composite particles, wherein the composite particles comprise:

(a) a porous carbon framework comprising micropores and mesopores, wherein the micropores and mesopores have a total pore volume as measured by gas adsorption of $P^1$ cm$^3$/g, wherein $P^1$ represents a natural number having a value of from 0.4 to 0.75, and wherein the micropore volume fraction is in the range of 0.5 to 0.85, based on the total volume of micropores and mesopores; and (b) a plurality of nanoscale elemental silicon domains located within the pores of the porous carbon framework;

wherein the weight ratio of silicon to the porous carbon framework in the composite particles is in the range of from [$0.9 \times P^1$ to $1.9 \times P^1$]: 1.

DETAILED DESCRIPTION

The invention relies in particular on the use of a porous carbon framework of relatively low porosity in order to provide a high strength framework to accommodate the electroactive silicon domains. In particular, the upper porosity limit of 0.75 cm$^3$/g ensures that the fracture resistance of the porous carbon framework under compressive stress is very high.

The porous carbon framework comprises a three-dimensionally interconnected open pore network comprising micropores and mesopores. The porous carbon framework may optionally further comprise a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

The total volume of micropores and mesopores in the porous carbon framework is from 0.4 to 0.75 cm$^3$/g. For the avoidance of doubt, references herein to the pore volume of the porous carbon framework relate (in the absence of any indication to the contrary) to the pore volume of the porous carbon framework in isolation, i.e. as measured in the absence of any electroactive material (or any other material) occupying the pores of the porous carbon framework.

The total volume of micropores and mesopores (i.e. the total pore volume of pores having a diameter in the range of 0 to 50 nm) is referred to herein as $P^1$ cm$^3$/g, wherein $P^1$ represents a dimensionless natural number having a value of at 0.4 to 0.75. The value of $P^1$ is used to correlate the available pore volume in the porous carbon framework and the weight ratio of silicon to the porous carbon framework as set out below.

Elemental silicon is located within the pore network of the porous carbon framework. The silicon therefore takes the form of a plurality of nanoscale silicon domains. As used herein, the term "nanoscale silicon domain" refers to a nanoscale body of silicon having dimensions that are determined by the location of the silicon within the micropores and/or mesopores of the porous carbon framework.

The microporous carbon framework provides the benefit that electroactive materials are located within the micropore network in the form of small domains with dimensions of the order of a few nanometres or less. These fine electroactive structures have a lower resistance to elastic deformation and higher fracture resistance than larger electroactive structures and are therefore able to lithiate and delithiate without excessive structural stress. The microporosity of the porous carbon framework therefore not only provides improved mechanical strength of the particles, but also ensures that the electroactive material itself is sufficiently resilient to withstand repeated volume changes over multiple charge-discharge cycles without significant loss of capacity.

The low pore volume of the porous carbon framework necessitates relatively high occupancy of the pore volume by silicon in order to provide material of sufficiently high gravimetric and volumetric capacity. The weight ratio of silicon to the porous carbon framework is related to the total micropore/mesopore volume by the ratio $[0.9 \times P^1$ to $1.9 \times P^1]$:1. By defining the weight ratio of silicon based on the value of $P^1$, the percentage volumetric occupancy of the pore volume by silicon is controlled within specific limits. For reference, a weight ratio of silicon to the porous carbon framework of $[0.9 \times P^1$ to $1.9 \times P^1]$: 1 corresponds to a silicon volume that is approximately 40 to 82% of the total volume of micropores and mesopores.

It has been found that the required weight ratio of silicon to porous carbon framework can only be obtained if the pore size distribution of the porous carbon framework is controlled within specific limits. Whereas high porosity frameworks, as developed by the applicant for other applications, have a highly interconnected pore network, with multiple pathways into the innermost pores, low porosity frameworks have far fewer interconnections within the pore network. In order for silicon to deposit preferentially within the pores instead of on the external surface of the porous carbon framework, it is necessary to have a relatively high micropore fraction in the porous carbon framework since the deposition of silicon into micropores is kinetically favoured. However, if the microporosity is too high, it is found that silicon deposits substantially on the outer surface of the porous carbon framework. It is believed that this is due to initial deposits of silicon forming blockages in the pore network. The availability of alternative pathways through the pore network is a function of the total pore volume. In low porosity materials, a relative lack alternative pathways through the pore network means that blockages of this type can render part of the pore volume inaccessible to silicon precursors. Ensuring internal deposition of silicon in low porosity carbon frameworks is therefore a particular challenge that has been addressed by the present inventors. In summary, it has been found that obtaining an electroactive material with the required properties of high compressive strength, limited expansion, high electrochemical capacity, and high capacity retention depends on the combination of total pore volume, pore size distribution and the degree of occupancy of the pores by silicon.

Another factor which relates to the interconnectivity of the pore network in low porosity frameworks is the particle size. Larger particles necessarily have a longer pathway through the pore network to the innermost pores and therefore the larger the particles, the more difficult it is to obtain the required internal deposition of silicon at the required weight ratio. Accordingly, in preferred embodiments of the invention, the median particle size ($D_{50}$) of the porous carbon framework as well as the particle size distribution are also carefully controlled. The controlled particle size distribution contributes additionally to particle strength as well as enabling improved close packing of the composite particles in electrode active layers, thereby reducing the need for excessive calendering pressure.

The highly microporous carbon framework of the composite material of the invention has high tensile fracture strength, and therefore can accommodate a significant amount of the expansion of the electroactive material within the pore volume without fracturing. Although full lithiation of the electroactive material may result in some external expansion of the entire composite material, the amount of external expansion is limited due to the controlled total pore volume and thus the maximal weight ratio of silicon to the porous carbon framework. Although the high strength porous carbon framework is less able to deform elastically under stress than frameworks of higher porosity, the controlled ratio of silicon to the porous carbon framework ensures that that the expansion stress on the porous carbon framework at maximum lithiation remains below the level necessary to cause fracturing.

Yet another factor in the exceptional performance of the inventive composite material is that SEI formation is minimised. By locating the electroactive material within the pore network, only a small area of the electroactive material surface is accessible to electrolyte and so SEI formation on the surface of the electroactive material is limited, thereby minimising irreversible lithium loss during the first charge cycle. Additional exposure of the electroactive material in subsequent charge-discharge cycles is also substantially prevented such that SEI formation is not a significant failure mechanism leading to capacity loss. This stands in clear contrast to the excessive SEI formation that characterises the material disclosed by Guo, for example (see above).

As a result of the unique particle architecture of the inventive particulate material, the composite particles have electrochemical performance that improves upon the incumbent $SiO_x$ technology. In particular, the particulate material of the invention has a greater electrochemical capacity, lower overall expansion, and comparable reversible capacity retention, resulting in the potential for higher loadings of the high capacity electroactive material than have been achieved previously.

References herein to the volume of micropores, mesopores and macropores in the porous carbon framework, and any references to the distribution of pore volume within the porous carbon framework, refer to the internal pore volume of the porous carbon framework taken in isolation (i.e. in the absence of any electroactive material or other materials occupying some or all of the pore volume).

The value of $P^1$ is preferably at least 0.42, more preferably at least 0.45, more preferably at least 0.47, more preferably at least 0.5. A higher porosity framework is advantageous since it allows a larger amount of silicon to be accommodated within the pore structure without compromising the resistance of the porous carbon framework to fracturing under compressive stress during electrode manufacture or expansion stress due to lithiation of the silicon. As noted above, the value of $P^1$ is capped at a value which ensures that the high compressive strength of the particles is maintained. Thus, the value of $P^1$ may be up to 0.75. However, more preferably, the value of $P^1$ may be up to 0.72, more preferably up to 0.7, more preferably up to 0.67, more preferably up to 0.65, more preferably up to 0.62, more preferably up to 0.6. Optionally, $P^1$ may have a value of less than 0.6.

$P^1$ may be in the range from 0.42 to 0.75, or in the range from 0.42 to 0.72, or in the range from 0.42 to 0.7, or in the range from 0.42 to 0.67, or in the range from 0.42 to 0.65, or in the range from 0.42 to 0.62, or in the range from 0.42 to 0.6, or in the range from 0.42 to less than 0.6, or in the range from 0.45 to 0.75, or in the range from 0.45 to 0.72, or in the range from 0.45 to 0.7, or in the range from 0.45 to 0.67, or in the range from 0.45 to 0.65, or in the range from 0.45 to 0.62, or in the range from 0.45 to 0.6, or in the range from 0.45 to less than 0.6, or in the range from 0.47 to 0.75, or in the range from 0.47 to 0.72, or in the range from 0.47 to 0.7, or in the range from 0.47 to 0.67, or in the range from 0.47 to 0.65, or in the range from 0.47 to 0.62, or in the range from 0.47 to 0.6, or in the range from 0.47 to less than 0.6, or in the range from 0.5 to 0.75, or in the range from 0.5 to 0.72, or in the range from 0.5 to 0.7, or in the range from 0.5 to 0.67, or in the range from 0.5 to 0.65, or in the range from 0.5 to 0.62, or in the range from 0.5 to 0.6, or in the range from 0.5 to less than 0.6.

As used herein, the micropore volume fraction refers to the volume of micropores expressed as a fraction of the total volume of micropores and mesopores. Put another way, the micropore volume fraction is the volume fraction of pores having diameter of 2 nm or less relative to the total volume of pores having a diameter of up to 50 nm. As discussed above, the micropore volume fraction needs to be carefully controlled within the range of 0.5 to 0.85, based on the total volume of micropores and mesopores. Preferably, the micropore volume fraction is at least 0.55, or at least 0.56, or at least 0.58, or at least 0.6, or at least 0.62, or at least 0.64, or at least 0.65, based on the total volume of micropores and mesopores. Preferably, the micropore volume fraction is up to 0.84, or up to 0.82, or up to 0.8, or up to 0.78, or up to 0.76, or up to 0.75, based on the total volume of micropores and mesopores.

The micropore volume fraction, based on the total volume of micropores and mesopores, may optionally be in the range from 0.5 to 0.84, or in the range from 0.5 to 0.82, or in the range from 0.5 to 0.8, or in the range from 0.5 to 0.78, or in the range from 0.5 to 0.76, or in the range from 0.5 to 0.75, or in the range from 0.55 to 0.84, or in the range from 0.55 to 0.82, or in the range from 0.55 to 0.8, or in the range from 0.55 to 0.78, or in the range from 0.55 to 0.76, or in the range from 0.55 to 0.75, or in the range from 0.6 to 0.84, or in the range from 0.6 to 0.82, or in the range from 0.6 to 0.8, or in the range from 0.6 to 0.78, or in the range from 0.6 to 0.76, or in the range from 0.6 to 0.75, or in the range from 0.65 to 0.84, or in the range from 0.65 to 0.82, or in the range from 0.65 to 0.8, or in the range from 0.65 to 0.78, or in the range from 0.65 to 0.76, or in the range from 0.65 to 0.75.

A micropore fraction within these ranges ensures that the silicon nanostructures have sufficiently small dimensions to prevent excessive stress during lithiation, while also ensuring that the pore dimensions are sufficiently large to allow a high level of silicon to be deposited (e.g. by chemical vapour intrusion techniques) within the pore structure of the porous carbon framework under acceptable processing times. If the micropore fraction is higher than specified, then silicon may form plugs and/or caps as it is deposited, particularly at higher rates of deposition, resulting in pockets of pore volume that are inaccessible and thus cannot be filled with silicon, resulting in excessive deposition of silicon on the external particle surfaces.

The $PD_{90}$ pore diameter of the porous carbon framework is preferably up to 20 nm, more preferably up to 15 nm, more preferably up to 12 nm, more preferably up to 10 nm, more preferably up to 8 nm, more preferably up to 6 nm, more preferably up to 5 nm.

The term "$PD_{90}$ pore diameter" as used herein refers to the volume-based 90th percentile pore diameter, based on the total volume of micropores and mesopores. In other words, the term "$D_{90}$ pore diameter" as used herein refers to the pore diameter below which 90% of the total micropore and mesopore volume, represented by $P^1$, is found). For the avoidance of doubt, any macropore volume (pore diameter greater than 50 nm) is not taken into account for the purpose of determining $PD_{90}$ values.

Preferably, the $PD_{95}$ pore diameter is up to 20 nm, or up to 15 nm, or up to 12 nm, or up to 10 nm, or up to 8 nm. "$PD_{95}$ pore diameter" as used herein refers to the volume-based 95th percentile pore diameter.

A minor volume fraction of pores having diameters in the larger mesopore range may be advantageous to facilitate electrolyte access to the silicon. Therefore, pores having a diameter in the range of 10 to 50 nm (i.e. larger mesopores) may optionally constitute at least 1%, at least 2%, at least 5% or at least 10% of the total micropore and mesopore volume of the porous carbon framework.

The pore size distribution of the porous carbon framework is preferably bimodal or multimodal. As used herein, the term "pore size distribution" relates to the distribution of pore size relative to the cumulative total internal pore volume of the porous carbon framework. A bimodal or multimodal pore size distribution may be preferred since close proximity between micropores and pores of larger diameter provides the advantage of efficient ionic transport through the porous network to the silicon. Accordingly, the particulate material has high ionic diffusivity and therefore improved rate performance.

The total volume of micropores and mesopores and the pore size distribution of micropores and mesopores are determined using nitrogen gas adsorption at 77 K using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm. As set out above, the value of $P^1$ is determined by taking into account only pores of diameter up to and including 50 nm (i.e. only micropores and mesopores), and the values of $PD_{90}$ and $PD_{95}$ and the micropore fraction are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous carbon framework comprises macropores, the volume of pores in the range of greater than 50 nm and up to 100 nm is identified herein with the value of $P^2$ cm$^3$/g and is measured by mercury porosimetry. As set out above, the value of $P^2$ relates to the pore volume of the porous carbon framework when measured in isolation, i.e. in the absence of silicon or any other material occupying the pores of the porous carbon framework.

For the avoidance of doubt, the value of $P^2$ takes into account only pores having a diameter of from greater than 50 nm up to and including 100 nm, i.e. it includes only the volume of macropores up to 100 nm in diameter. Any pore volume measured by mercury porosimetry at pore sizes of 50 nm or below is disregarded for the purposes of determining the value of $P^2$ (as set out above, nitrogen adsorption is used to characterize the mesopores and micropores). Pore volume measured by mercury porosimetry above 100 nm is assumed for the purposes of the invention to be inter-particle porosity and is also not take into account when determining the value of $P^2$.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 140° for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology", 1997, Micromeritics Instrument Corporation, ISBN 0-9656783-0.

The volume of macropores (and therefore the value of $P^2$) is preferably small as compared to the volume of micropores and mesopores (and therefore the value of $P^1$). While a small fraction of macropores may be useful to facilitate electrolyte access into the pore network, the advantages of the invention are obtained substantially by accommodating silicon in micropores and smaller mesopores.

Thus, in accordance with the invention the total volume of macropores in the porous carbon framework is $P^2$ cm$^3$/g as measured by mercury porosimetry, wherein $P^2$ preferably has a value of up to $0.2 \times P^1$, or up to $0.1 \times P^1$, or up to $0.05 \times P^1$, or up to $0.02 \times P^1$, or up to $0.01 \times P^1$, or up to $0.005 \times P^1$.

It will be appreciated that intrusion techniques such as gas adsorption and mercury porosimetry are effective only to determine the pore volume of pores that are accessible to nitrogen or to mercury from the exterior of the porous carbon framework. Porosity values ($P^1$ and $P^2$) as specified herein shall be understood as referring to the volume of open pores, i.e. pores that are accessible to a fluid from the exterior of the porous carbon framework. Fully enclosed pores which cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining the value of $P^1$.

The porous carbon framework may comprise crystalline carbon or amorphous carbon, or a mixture of amorphous and crystalline carbon. The porous carbon framework may be either a hard carbon or soft carbon framework and may suitably be obtained by known procedures involving the pyrolysis of carbon-containing materials, including organic materials, resins and polymers. Porous carbon materials may also be obtained by other processes, for instance from carbide-containing precursors. The porous carbon framework preferably has an elemental composition including at least 90 wt % carbon, more preferably at least 95 wt % carbon, more preferably at least 98 wt % carbon. The porous carbon framework may optionally comprise minor amounts of other elements, such as oxygen, nitrogen, sulphur and hydrogen. The elemental composition of the porous carbon framework may be determined by conventional elemental analysis techniques performed in the absence of silicon.

As used herein, the term "hard carbon" refers to a disordered carbon matrix in which carbon atoms are found predominantly in the sp$^2$ hybridised state (trigonal bonds) in nanoscale polyaromatic domains. The polyaromatic domains are cross-linked with a chemical bond, e.g. a C—O—C bond.

Due to the chemical cross-linking between the polyaromatic domains, hard carbons cannot be converted to graphite at high temperatures. Hard carbons have graphite-like character as evidenced by the large G-band (~1600 cm$^{-1}$) in the Raman spectrum. However, the carbon is not fully graphitic as evidenced by the significant D-band (~1350 cm$^{-1}$) in the Raman spectrum.

As used herein, the term "soft carbon" also refers to a disordered carbon matrix in which carbon atoms are found predominantly in the sp$^2$ hybridised state (trigonal bonds) in polyaromatic domains having dimensions in the range of 5-200 nm. In contrast to hard carbons, the polyaromatic domains in soft carbons are associated by intermolecular forces but are not cross-linked with a chemical bond. This means that they will graphitise at high temperature. The porous carbon framework preferably comprises at least 50% sp$^2$ hybridised carbon as measured by XPS. For example, the porous carbon framework may suitably comprise from 50% to 98% sp$^2$ hybridised carbon, from 55% to 95% sp$^2$ hybridised carbon, from 60% to 90% sp$^2$ hybridised carbon, or from 70% to 85% sp$^2$ hybridised carbon.

A variety of different materials may be used to prepare suitable porous carbon frameworks. Examples of organic materials that may be used include plant biomass including lignocellulosic materials (such as coconut shells, rice husks, wood etc.) and fossil carbon sources such as coal. Examples of resins and polymeric materials which form porous carbon frameworks on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different hard carbon materials are available in the art depending on the starting material and the conditions of the pyrolysis process.

The porous carbon framework may undergo a chemical or gaseous activation process to increase the volume of mesopores and micropores. A suitable activation process comprises contacting pyrolysed carbon with one or more of oxygen, steam, CO, CO$_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

The amount of silicon in the composite particles of the invention is selected such that at least around 40% and up to around 78% of the internal pore volume of the porous carbon framework is occupied by silicon (in the uncharged state). Preferably the silicon occupies from about 50% to about 75% of the internal pore volume of the porous carbon framework, more preferably from about 55% to 70% of the internal pore volume of the porous carbon framework. Within these preferred ranges, the pore volume of the porous carbon framework is effective to accommodate expansion of the silicon during charging and discharging, but avoids excess pore volume which does not contribute to the volumetric capacity of the particulate material. However, the amount of silicon is also not so high as to impede effective lithiation due to inadequate metal-ion diffusion rates or due to inadequate expansion volume resulting in mechanical resistance to lithiation.

As noted above, the amount of silicon in the porous carbon framework can be correlated to the available pore volume by the requirement that the weight ratio of silicon to the porous carbon framework is in the range from [0.9×$P^1$ to 1.9×$P^1$]: 1. This relationship takes into account the density of silicon and the pore volume of the porous carbon framework to define a weight ratio of silicon at which the pore volume is estimated to be around 40% to 82% occupied. Preferably, the weight ratio of silicon to the porous carbon framework is in the range from [0.9×$P^1$ to 1.8×$P^1$]: 1, which indicates that the pore volume is around 40% to 78% occupied.

Preferably, the weight ratio of silicon to the porous carbon framework is at least 0.95×$P^1$, or at least 1×$P^1$, or at least 1.05×$P^1$, or at least 1.1×$P^1$, or at least 1.15×$P^1$, or at least 1.2×$P^1$.

Preferably, the weight ratio of silicon to the porous carbon framework is up to 1.85×$P^1$, or up to 1.8×$P^1$, or up to 1.75×$P^1$, or up to 1.7×$P^1$, or up to 1.65×$P^1$, or up to 1.6×$P^1$.

For example, the weight ratio of silicon to the porous carbon framework may be in the range from [0.95×$P^1$ to 1.85×$P^1$]: 1, or in the range from [0.95×$P^1$ to 1.8×$P^1$]: 1, or in the range from [1×$P^1$ to 1.8×$P^1$]: 1, or in the range from [1.05×$P^1$ to 1.75×$P^1$]: 1, or in the range from [1.1×$P^1$ to 1.7×$P^1$]: 1, or in the range from [1.15×$P^1$ to 1.7×$P^1$]: 1, or in the range from [1.2×$P^1$ to 1.65×$P^1$]: 1, or in the range from [1.25×$P^1$ to 1.65×$P^1$]: 1, or in the range from [1.3×$P^1$ to 1.6×$P^1$]: 1, or in the range from [1.35×$P^1$ to 1.6×$P^1$]: 1, or in the range from [1.4×$P^1$ to 1.55×$P^1$]: 1.

The composite particles preferably comprise less than 10 wt % oxygen, more preferably less than 5 wt % oxygen, more preferably less than 2 wt % oxygen based on the total weight of the composite particles. Preferably silicon and carbon together constitute at least 90 wt % of the composite particles, more preferably at least 95 wt % of the composite particles.

The composite particles may optionally include pores in which fully enclosed void space is capped by the silicon, such that electrolyte access into the void space is prevented.

Preferably at least 80 wt %, more preferably at least 85 wt %, more preferably at least 90 wt %, more preferably at least 95 wt %, even more preferably at least 98 wt % of the silicon in the composite particles is located within the internal pore volume of the porous carbon framework such that there is no or very little silicon located on the external surfaces of the composite particles.

The particulate materials of the invention can be further characterised by their performance under thermogravimetric analysis (TGA) in air. Preferably no more than 10%, more preferably no more than 5%, more preferably no more than 2% of the silicon content of the particulate material is unoxidised at 800° C. when the particulate material is analysed by TGA in air with a temperature ramp rate of 10° C./min.

The determination of the amount of unoxidised silicon is derived from the characteristic TGA trace for these materials. A mass increase at ca. 300-500° C. corresponds to initial oxidation of silicon to $SiO_2$, and is followed by mass loss at ca. 500-600° C. as carbon is oxidised to $CO_2$ gas. Above ca. 600° C., there is a further mass increase corresponding to the continued conversion of silicon to $SiO_2$ which increases toward an asymptotic value above 1000° C. as silicon oxidation goes to completion.

For the purposes of this analysis, it is assumed that any mass increase above 800° C. corresponds to the oxidation of silicon to $SiO_2$ and that the total mass at completion of oxidation is $SiO_2$. This allows the percentage of unoxidised silicon at 800° C. as a proportion of the total amount of silicon to be determined according to the following formula:

$$Z=1.875\times[(M_f-M_{800})/M_f]\times100\%$$

Wherein Z is the percentage of unoxidized silicon at 800° C., $M_f$ is the mass of the sample at completion of oxidation and $M_{800}$ is the mass of the sample at 800° C.

Without being bound by theory, it is understood that the temperature at which silicon is oxidised under TGA corresponds broadly to the length scale of the oxide coating on the silicon due to diffusion of oxygen atoms through the oxide layer being thermally activated. The size of the silicon nanostructure and its location limit the length scale of the oxide coating thickness. Therefore, it is understood that silicon deposited in micropores and smaller mesopores will oxidise at a lower temperature than deposits of silicon on a particle surface due to the necessarily thinner oxide coating existing on these structures. Accordingly, preferred materials according to the invention exhibit substantially complete oxidation of silicon at low temperatures consistent with the small length scale of silicon nanostructures that are located in micropores and smaller mesopores.

Preferably, the total volume of micropores and optional mesopores in the composite particles (i.e. in the presence of the silicon), as measured by nitrogen gas adsorption, is up to 0.15×$P^1$, or up to 0.10×$P^1$, or up to 0.05×$P^1$, or up to 0.02×$P^1$.

The weight ratio of silicon to the porous carbon framework can be determined by elemental analysis. Elemental analysis is used to determine the weight percentages of both silicon and carbon in the composite particles. Optionally, the amounts of hydrogen, nitrogen and oxygen may also be determined by elemental analysis. Preferably, elemental analysis is also used to determine the weight percentage of carbon (and optionally hydrogen, nitrogen and oxygen) in the porous carbon framework alone. Determining the weight percentage of carbon in the in the porous carbon framework alone takes account of the possibility that the porous carbon framework contains a minor amount of heteroatoms within its molecular framework. Both measurements taken together allow the weight percentage of silicon relative to the entire porous carbon framework to be determined reliably.

The silicon content is preferably determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous carbon framework alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from LECO Corporation.

The composite particles preferably have a low total oxygen content. Oxygen may be present in the composite particles for instance as part of the porous carbon framework or as an oxide layer on any exposed silicon surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The silicon may optionally comprise a minor amount of one or more dopants. Suitable dopants include boron and phosphorus, other n-type or p-type dopants, nitrogen, or germanium. Preferably, the dopants are present in a total amount of no more than 2 wt % based on the total amount of silicon and the dopant(s).

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

The terminology "$D_n$" used herein to define particle diameter distributions is to be distinguished from the terminology "$PD_n$" which is used herein, as described above, to define pore diameter distributions.

Particle diameters and particle size distributions can be determined by routine laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The composite particles may have a $D_{50}$ particle diameter in the range from 1 to 30 μm. Optionally, the $D_{50}$ particle diameter may be at least 1 μm, or at least 2 μm, or at least 3 μm, or at least 4 μm, or at least 5 μm. Optionally the $D_{50}$ particle diameter may be up to 20 μm, or up to 18 μm, or up to 16 μm, or up to 14 μm, or up to 12 μm, or up to 10 μm.

For instance, the composite particles may have a $D_{50}$ particle diameter in the range from 1 to 20 μm, or from 1 to 18 μm, or from 1 to 16 μm, or from 2 to 16 μm, or from 2 to 14 μm, or from 3 to 12 μm, or from 4 to 10 μm. Particles within these size ranges and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness in the conventional range from 20 to 50 μm.

The $D_{10}$ particle diameter of the composite particles is preferably at least 0.5 μm, or at least 0.8 μm, or at least 1 μm, or at least 1.5 μm, or at least 2 μm. By maintaining the $D_{10}$ particle diameter at 0.5 μm or more, the potential for undesirable agglomeration of sub-micron sized particles is reduced, resulting in improved dispersibility of the particulate material and improved capacity retention.

The $D_{90}$ particle diameter of the composite particles is preferably up to 50 μm, or up to 40 μm, or up to 30 μm, or up to 25 μm, or up to 20 μm. The presence of very large particles results in non-uniform forming packing of the particles in electrode active layers, thus disrupting the formation of dense electrode layers, particularly electrode layers having a thickness in the range from 20 to 50 μm. Therefore, it is preferred that the $D_{90}$ particle diameter is up to 40 μm, and more preferably lower still.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The composite particles may be spheroidal in shape. Spheroidal particles as defined herein may include both spherical and ellipsoidal particles and the shape of the composite particles of the invention may suitably be defined by reference to the sphericity and the aspect ratio of the particles of the invention. Spheroidal particles are found to be particularly well-suited to dispersion in slurries without the formation of agglomerates. In addition, the use of porous spheroidal particles is surprisingly found to provide a further improvement in strength when compared to porous particles and porous particle fragments of irregular morphology.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n} \sum_{i=1}^{n} \left[ \frac{4 \cdot \pi \cdot A_m}{(C_m)^2} \right]$$

wherein n represents the number of particles in the population.

As used herein, the term "spheroidal" as applied to the composite particles of the invention shall be understood to refer to a material having an average sphericity of at least 0.70. Preferably, the porous spheroidal particles of the invention have an average sphericity of at least 0.85, more preferably at least 0.90, more preferably at least 0.92, more preferably at least 0.93, more preferably at least 0.94, more preferably at least 0.95. Optionally, the porous spheroidal particles may have an average sphericity of at least 0.96, or at least 0.97, or at least 0.98, or at least 0.99.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The composite particles of the invention preferably have a BET surface area of up to 100 $m^2/g$, or up to 80 $m^2/g$, or up to 60 $m^2/g$, or up to 50 $m^2/g$, or up to 40 $m^2/g$, or up to 30 $m^2/g$, or up to 25 $m^2/g$, or up to 20 $m^2/g$, or up to 15 $m^2/g$, or up to 10 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. In general, a low BET surface area is preferred in order to minimise the formation of solid electrolyte interphase (SEI) layers at the surface of the composite particles during the first charge-discharge cycle of an anode comprising the particulate material of the invention. However, a BET surface area which is excessively low results in unacceptably low charging rate and capacity limitations due to the inaccessibility of the bulk of the electroactive material to metal ions in the surrounding electrolyte. For instance, the BET surface area is preferably at least 0.1 $m^2/g$, or at least 1 $m^2/g$, or at least 2 $m^2/g$, or at least 5 $m^2/g$. For instance, the BET surface area may be in the range from 1 $m^2/g$ to 25 $m^2/g$, more preferably in the range from 2 to 15 $m^2/g$.

The particulate material of the invention typically has a specific charge capacity on first lithiation of 1200 to 2000 mAh/g. Preferably the particulate material of the invention has a specific charge capacity on first lithiation of at least 1400 mAh/g.

The composite particles of the invention are suitably prepared via chemical vapor infiltration (CVI) of a silicon-containing precursor into the pore structure of the porous carbon framework. As used herein, CVI refers to processes in which a gaseous silicon-containing precursor is thermally decomposed on a surface to form elemental silicon at the surface and gaseous by-products.

Suitable gaseous silicon-containing precursors include silane ($SiH_4$), silane derivatives (e.g. disilane, trisilane and tetrasilane), and trichlorosilane ($SiHCl_3$). The silicon-containing precursors may be used either in pure form or more usually as a diluted mixture with an inert carrier gas, such as nitrogen or argon. For instance, the silicon-containing precursor may be used in an amount in the range from 0.5-20 vol %, or 1-10 vol %, or 1-5 vol % based on the total volume of the silicon-containing precursor and the inert carrier gas. The CVI process is suitably carried out at low partial pressure of silicon precursor with total pressure of 101.3 kPa (i.e. 1 atm), the remaining partial pressure made up to atmospheric pressure using an inert padding gas such as hydrogen, nitrogen or argon.

Deposition temperatures ranging from 400-700° C. are used, for example from 450-550° C., or 450-500° C. The CVI process may suitably be performed in a fixed bed reactor, rotary kiln, or fluidized bed reactor (including spouted bed reactor).

As an example of a fixed-bed reactor method, 1.8 g of a particulate porous framework was placed on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450-500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

The particulate material of the invention may optionally include a conductive carbon coating. Suitably a conductive carbon coating may be obtained by a chemical vapour deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range from 2 to 30 nm. Optionally, the carbon coating may be porous and/or may only cover partially the surface of the composite particles.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in electrode compositions, and also creates an improved surface for the formation of a stable SEI layer, resulting in improved capacity retention on cycling.

In accordance with the first aspect of the invention, there are further provided particulate materials according to the following aspects 1-1 to 1-25.

Aspect 1-1: A particulate material according to the first aspect of the invention, wherein:
(i) the micropore volume fraction is in the range of 0.55 to 0.85;
(ii) the weight ratio of silicon to the porous carbon framework in the composite particles is in the range from $[0.9 \times P^1$ to $1.8 \times P^1]$: 1.

Aspect 1-2: A particulate material according to the first aspect of the invention, wherein:
(i) $P^1$ is in the range from 0.45 to 0.75;
(ii) the micropore volume fraction is in the range of 0.55 to 0.8;
(iii) the weight ratio of silicon to the porous carbon framework in the composite particles is in the range from $[0.9 \times P^1$ to $1.6 \times P^1]$: 1.

Aspect 1-3: A particulate material according to the first aspect of the invention, wherein:
(i) $P^1$ is in the range from 0.45 to 0.75;
(ii) the micropore volume fraction is in the range of 0.55 to 0.75;
(iii) the weight ratio of silicon to the porous carbon framework in the composite particles is in the range from $[0.9 \times P^1$ to $1.6 \times P^1]$: 1.

Aspect 1-4: A particulate material according to the first aspect of the invention, wherein:
(i) $P^1$ is in the range from 0.45 to 0.75;
(ii) the micropore volume fraction is in the range of 0.6 to 0.75;
(iii) the weight ratio of silicon to the porous carbon framework in the composite particles is in the range from $[0.9 \times P^1$ to $1.6 \times P^1]$: 1.

Aspect 1-5: A particulate material according to the first aspect of the invention, wherein:
(i) $P^1$ is in the range from 0.5 to 0.75;
(ii) the micropore volume fraction is in the range of 0.55 to 0.8;
(iii) the weight ratio of silicon to the porous carbon framework in the composite particles is in the range from $[0.9 \times P^1$ to $1.6 \times P^1]$: 1.

Aspect 1-6: A particulate material according to the first aspect of the invention, wherein:
(i) $P^1$ is in the range from 0.5 to 0.75;
(ii) the micropore volume fraction is in the range of 0.55 to 0.75;
(iii) the weight ratio of silicon to the porous carbon framework in the composite particles is in the range from $[0.9 \times P^1$ to $1.6 \times P^1]$: 1.

Aspect 1-7: A particulate material according to the first aspect of the invention, wherein:
(i) $P^1$ is in the range from 0.5 to 0.75;
(ii) the micropore volume fraction is in the range of 0.6 to 0.75;
(iii) the weight ratio of silicon to the porous carbon framework in the composite particles is in the range from $[0.9 \times P^1$ to $1.6 \times P^1]$: 1.

Aspect 1-8: A particulate material according to the first aspect of the invention, wherein:
(i) $P^1$ is in the range from 0.5 to 0.7;
(ii) the micropore volume fraction is in the range of 0.55 to 0.8;
(iii) the weight ratio of silicon to the porous carbon framework in the composite particles is in the range from $[0.9 \times P^1$ to $1.6 \times P^1]$: 1.

Aspect 1-9: A particulate material according to the first aspect of the invention, wherein:
(i) $P^1$ is in the range from 0.5 to 0.7;
(ii) the micropore volume fraction is in the range of 0.55 to 0.75;
(iii) the weight ratio of silicon to the porous carbon framework in the composite particles is in the range from $[0.9 \times P^1$ to $1.6 \times P^1]$: 1.

Aspect 1-10: A particulate material according to the first aspect of the invention, wherein:
(i) $P^1$ is in the range from 0.5 to 0.7;
(ii) the micropore volume fraction is in the range of 0.6 to 0.75;
(iii) the weight ratio of silicon to the porous carbon framework in the composite particles is in the range from $[0.9 \times P^1$ to $1.6 \times P^1]$: 1.

Aspect 1-11: A particulate material according to the first aspect of the invention, wherein:
(i) $P^1$ is in the range from 0.45 to less than 0.6;
(ii) the micropore volume fraction is in the range of 0.55 to 0.8;
(iii) the weight ratio of silicon to the porous carbon framework in the composite particles is in the range from $[0.9 \times P^1$ to $1.6 \times P^1]$: 1.

Aspect 1-12: A particulate material according to the first aspect of the invention, wherein:
(i) $P^1$ is in the range from 0.45 to less than 0.6;
(ii) the micropore volume fraction is in the range of 0.55 to 0.75;
(iii) the weight ratio of silicon to the porous carbon framework in the composite particles is in the range from $[0.9 \times P^1$ to $1.6 \times P^1]$: 1.

Aspect 1-13: A particulate material according to the first aspect of the invention, wherein:
(i) $P^1$ is in the range from 0.45 to less than 0.6;
(ii) the micropore volume fraction is in the range of 0.6 to 0.75;
(iii) the weight ratio of silicon to the porous carbon framework in the composite particles is in the range from $[0.9 \times P^1$ to $1.6 \times P^1]$: 1.

Aspect 1-14: A particulate material according to the first aspect of the invention, wherein:
(i) $P^1$ is in the range from 0.45 to 0.75;
(ii) the micropore volume fraction is in the range of 0.55 to 0.8;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-15: A particulate material according to the first aspect of the invention, wherein:

(i) $P^1$ is in the range from 0.45 to 0.75;
(ii) the micropore volume fraction is in the range of 0.55 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-16: A particulate material according to the first aspect of the invention, wherein:
(i) $P^1$ is in the range from 0.45 to 0.75;
(ii) the micropore volume fraction is in the range of 0.6 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-17: A particulate material according to the first aspect of the invention, wherein:
(i) $P^1$ is in the range from 0.5 to 0.75;
(ii) the micropore volume fraction is in the range of 0.55 to 0.8;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-18: A particulate material according to the first aspect of the invention, wherein:
(i) $P^1$ is in the range from 0.5 to 0.75;
(ii) the micropore volume fraction is in the range of 0.55 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-19: A particulate material according to the first aspect of the invention, wherein:
(i) $P^1$ is in the range from 0.5 to 0.75;
(ii) the micropore volume fraction is in the range of 0.6 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-20: A particulate material according to the first aspect of the invention, wherein:
(i) $P^1$ is in the range from 0.5 to 0.7;
(ii) the micropore volume fraction is in the range of 0.55 to 0.8;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-21: A particulate material according to the first aspect of the invention, wherein:
(i) $P^1$ is in the range from 0.5 to 0.7;
(ii) the micropore volume fraction is in the range of 0.55 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-22: A particulate material according to the first aspect of the invention, wherein:
(i) $P^1$ is in the range from 0.5 to 0.7;
(ii) the micropore volume fraction is in the range of 0.6 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-23: A particulate material according to the first aspect of the invention, wherein:
(i) $P^1$ is in the range from 0.45 to less than 0.6;
(ii) the micropore volume fraction is in the range of 0.55 to 0.8;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-24: A particulate material according to the first aspect of the invention, wherein:
(i) $P^1$ is in the range from 0.45 to less than 0.6;
(ii) the micropore volume fraction is in the range of 0.55 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-25: A particulate material according to the first aspect of the invention, wherein:
(i) $P^1$ is in the range from 0.45 to less than 0.6;
(ii) the micropore volume fraction is in the range of 0.6 to 0.75;
(iii) the weight ratio of silicon to the porous carbon framework in the composite particles is in the range from $[1 \times P^1$ to $1.5 \times P^1]$: 1;
(iv) the $PD_{90}$ pore diameter is up to 10 nm.

Aspect 1-26: A particulate material according to the first aspect of the invention, wherein:
(i) $P^1$ is in the range from 0.45 to 0.75;
(ii) the micropore volume fraction is in the range of 0.55 to 0.8;
(iii) the weight ratio of silicon to the porous carbon framework in the composite particles is in the range from $[1 \times P^1$ to $1.8 \times P^1]$: 1;
(iv) the $PD_{90}$ pore diameter is up to 8 nm.

Aspect 1-27: A particulate material according to the first aspect of the invention, wherein:
(i) $P^1$ is in the range from 0.45 to 0.75;
(ii) the micropore volume fraction is in the range of 0.55 to 0.8;
(iii) the weight ratio of silicon to the porous carbon framework in the composite particles is in the range from $[1 \times P^1$ to $1.8 \times P^1]$: 1;
(iv) the $PD_{90}$ pore diameter is up to 6 nm.

In accordance with the present invention, it is to be understood that the preferred/optional features disclosed herein in relation to the first aspect of the invention that fall within the scope of the above-described aspects 1-1 to 1-27 are also to be taken as preferred/optional features of the aspects 1-1 to 1-27. Likewise, any features of the dependent claims that fall within the scope of the above-described aspects 1-1 to 1-27 are also to be interpreted as though those claims also depended from aspects 1-1 to 1-27.

In a second aspect of the invention, there is provided a composition comprising a particulate material according to the first aspect of the invention and at least one other component. In particular, there is provided a composition comprising a particulate material according to the first aspect of the invention and at least one other component selected from: (i) a binder; (ii) a conductive additive; and (iii) an additional particulate electroactive material. The composition according to the second aspect of the invention is useful as an electrode composition, and thus may be used to form the active layer of an electrode.

The particulate material used to prepare the composition of the second aspect of the invention may have any of the features described as preferred or optional with regard to the first aspect of the invention.

The composition may be a hybrid electrode composition which comprises a particulate material according to the first aspect of the invention and at least one additional particulate electroactive material. Examples of additional particulate electroactive materials include graphite, hard carbon, silicon, tin, germanium, aluminium and lead. The at least one additional particulate electroactive material is preferably selected from graphite and hard carbon, and most preferably the at least one additional particulate electroactive material is graphite.

In the case of a hybrid electrode composition, the composition preferably comprises from 15 to 60 wt %, or from 20 to 50 wt %, or from 30 to 50 wt % of the particulate material according to the first aspect of the invention, based on the total dry weight of the composition.

The at least one additional particulate electroactive material is suitably present in an amount of from 20 to 70 wt %, or from 25 to 65 wt %, or from 30 to 60 wt % of the at least one additional particulate electroactive material.

The at least one additional particulate electroactive material preferably has a $D_{50}$ particle diameter in the range from 10 to 50 μm, preferably from 10 to 40 μm, more preferably from 10 to 30 μm and most preferably from 10 to 25 μm, for example from 15 to 25 μm.

The $D_{10}$ particle diameter of the at least one additional particulate electroactive material is preferably at least 5 μm, more preferably at least 6 μm, more preferably at least 7 μm, more preferably at least 8 μm, more preferably at least 9 μm, and still more preferably at least 10 μm.

The $D_{90}$ particle diameter of the at least one additional particulate electroactive material is preferably up to 100 μm, more preferably up to 80 μm, more preferably up to 60 μm, more preferably up to 50 μm, and most preferably up to 40 μm.

The at least one additional particulate electroactive material is preferably selected from carbon-comprising particles, graphite particles and/or hard carbon particles, wherein the graphite and hard carbon particles have a $D_{50}$ particle diameter in the range from 10 to 50 μm. Still more preferably, the at least one additional particulate electroactive material is selected from graphite particles, wherein the graphite particles have a $D_{50}$ particle diameter in the range from 10 to 50 μm.

The composition may also be a non-hybrid (or "high loading") electrode composition which is substantially free of additional particulate electroactive materials. In this context, the term "substantially free of additional particulate electroactive materials" should be interpreted as meaning that the composition comprises less than 15 wt %, preferably less than 10 wt %, preferably less than 5 wt %, preferably less than 2 wt %, more preferably less than 1 wt %, more preferably less than 0.5 wt % of any additional electroactive materials (i.e. additional materials which are capable of inserting and releasing metal ions during the charging and discharging of a battery), based on the total dry weight of the composition.

A "high-loading" electrode composition of this type preferably comprises at least 50 wt %, or at least 60 wt %, or at least 70 wt %, or at least 80 wt %, or at least 90 wt % of the particulate material according to the first aspect of the invention, based on the total dry weight of the composition.

The composition may optionally comprise a binder. A binder functions to adhere the composition to a current collector and to maintain the integrity of the composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt %, preferably 2 to 10 wt % and most preferably 5 to 10 wt %, based on the total dry weight of the composition.

The binder may optionally be present in combination with one or more additives that modify the properties of the binder, such as cross-linking accelerators, coupling agents and/or adhesive accelerators.

The composition may optionally comprise one or more conductive additives. Preferred conductive additives are non-electroactive materials which are included so as to improve electrical conductivity between the electroactive components of the composition and between the electroactive components of the composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt %, preferably 2 to 10 wt % and most preferably 5 to 10 wt %, based on the total dry weight of the composition.

In a third aspect, the invention provides an electrode comprising a particulate material as defined with reference to the first aspect of the invention in electrical contact with a current collector. The particulate material used to prepare the electrode of the third aspect of the invention may have any of the features described as preferred or optional with regard to the first aspect of the invention.

As used herein, the term current collector refers to any conductive substrate which is capable of carrying a current to and from the electroactive particles in the composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range from 10 μm to 1 mm, for example from 20 to 500 μm, or from 50 to 200 μm.

Preferably, the electrode comprises a composition as defined with reference to the second aspect of the invention in electrical contact with a current collector. The composition may have any of the features described as preferred or optional with regard to the second aspect of the invention.

The electrode of the third aspect of the invention may suitably be fabricated by combining the particulate material of the invention (optionally in the form of the composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass which may then be bonded to a current collector by known methods.

The electrode of the third aspect of the invention may be used as the anode of a metal-ion battery. Thus, in a fourth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably the rechargeable metal-ion battery of the invention is a lithium-ion battery, and the cathode active material is capable of releasing and accepting lithium ions.

The cathode active material is preferably a metal oxide-based composite. Examples of suitable cathode active materials include $LiCoO_2$, $LiCO_{0.99}Al_{0.01}O_2$, $LiNiO_2$, $LiMnO_2$, $LiCO_{0.5}Ni_{0.5}O_2$, $LiCO_{0.7}Ni_{0.3}O_2$, $LiCO_{0.8}Ni_{0.2}O_2$, $LiCO_{0.82}Ni_{0.18}O_2$, $LiCO_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $LiSNI_2$, $Li_3N$, $LiI$, $LiSiO_4$, $Li_2SiS_3$, $Li_4SiO_4$, $LiOH$ and $Li_3PO_4$.

The lithium salt is suitably soluble in the chosen solvent or mixture of solvents. Examples of suitable lithium salts include $LiCl$, $LiBr$, $LiI$, $LiClO_4$, $LiBF_4$, $LiBC_4O_8$, $LiPF_6$, $LiCF_3SO_3$, $LiASF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In a fifth aspect, the invention provides the use of a particulate material as defined with reference to the first aspect of the invention as an anode active material. Preferably, the particulate material is in the form of a composition as defined with reference to the second aspect of the invention, and most preferably the composition comprises one or more additional particulate electroactive materials as defined above.

EXAMPLES

Porous carbon frameworks $C_1$ to $C_5$ used in the following examples have the characteristics set out in Table 1.

TABLE 1

| Carbon | BET, $m^2/g$ | $P_1$ | MPF* | Volumetric Pore size distribution based on $P_1$ | | | | |
|---|---|---|---|---|---|---|---|---|
| | | | | $PD_{10}$ (nm) | $PD_{30}$ (nm) | $PD_{50}$ (nm) | $PD_{75}$ (nm) | $PD_{90}$ (nm) |
| C1 | 1645 | 0.70 | 0.70 | 0.56 | 0.78 | 1.01 | 2.18 | 3.56 |
| C2 | 1568 | 0.69 | 0.70 | 0.59 | 0.77 | 0.99 | 2.19 | 4.99 |
| C3 | 943 | 0.36 | 0.90 | | 0.58 | 0.65 | 0.94 | 1.47 |
| C4 | 1037 | 0.76 | 0.23 | 0.59 | 9.15 | 18.62 | 27.34 | 36.17 |
| C5 | 1026 | 0.59 | 0.51 | 0.55 | 0.79 | 1.47 | 10.3 | 25.8 |
| C6 | 1599 | 0.73 | 0.59 | 0.58 | 0.82 | 1.19 | 2.65 | 6.11 |

*MPF = micropore fraction

Example 1-Preparation of Composite Particles in a Fixed Bed Reactor

Silicon-carbon composite particles were prepared by placing 1.8 g of a particulate porous framework with the properties listed in Table 1 on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450-500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

The composites prepared according to Example 1 have the characteristics set out in Table 2 below.

TABLE 2

| Sample No. | Framework | BET (m²/g) | Si wt % | Coarse Si* (Z, %) |
|---|---|---|---|---|
| S1 | C1 | 27 | 49 | 5.8 |
| S2 | C2 | 46 | 51 | 4.8 |
| S3** | C3 | 2 | 20 | 100 |
| S4** | C4 | 43 | 56 | 47 |
| S5 | C5 | 126 | 40 | 15 |
| S6 | C6 | 108 | 42 | 8.5 |

*Coarse Si = Wt % oxidised silicon at 800° C. by TGA method described above and calculated using the formula for Z
**Comparative example The data show that the porous carbon framework must have a carefully controlled pore size distribution in order to enable efficient infiltration of silicon into the micropores.

The TGA analysis of Sample S3 demonstrates that if the micropore fraction is too high, it is not possible to infiltrate silicon into the pores of the porous carbon framework and the silicon deposits instead on the surface of the porous carbon framework. This is demonstrated by the high level of coarse silicon measured by TGA analysis. It is believed that this is because initial silicon deposition rapidly blocks pore openings, preventing the silane gas from accessing the internal pore space. A minimum amount of mesoporosity is therefore necessary to ensure sufficient transport of the silane gas to the micropores. However, the TGA analysis of Sample S4 demonstrates that if the micropore fraction is too low, an excessive amount of coarse silicon is again obtained. It is believed that the micropore volume is rapidly used up resulting in the formation of larger silicon deposits both in mesopores and on the surface of the porous carbon framework.

In contrast, the TGA analysis of Samples S1, S2, S5 and S6 shows a very low content of coarse silicon, indicating that the silicon is essentially all present in the form of fine silicon nanostructures that are located in micropores and smaller mesopores. These fine silicon nanostructures have low resistance to deformation and higher fracture resistance than coarse silicon structures, and are therefore better suited to use as electroactive materials in lithium ion batteries.

Example 2-Preparation of Composite Particles in a Rotary Tube Furnace Reactor

Silicon-carbon composite particles were prepared by placing 5 g of a particulate porous framework with the properties listed in Table 1 into a quartz tube with a bulb section (11.4 cm long). The quartz tube is then placed inside a rotary reactor tube furnace with heating zone of approximately 15×20 cm (L×D) with gas inlet and outlet lines located approx. 29 cm away from the hot zone of the furnace. The quartz tube within the furnace rotates ca. 315° clockwise and then anti-clockwise, thereby continuously moving/rotating the porous carbon. The furnace tube was purged with nitrogen gas for 30 minutes at room temperature, then the sample temperature was increased to 450-500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

A composite prepared according to Example 2 has the characteristics set out in Table 3 below.

TABLE 3

| Sample No. | Framework | BET (m²/g) | Si wt% | Coarse Si* (Z, %) |
|---|---|---|---|---|
| S7 | C2 | 78 | 51.6 | 10.1 |

Example 3-Preparation of Electrodes

Anodes and test cells incorporating the particulate Si—C composite materials of Table 1 were prepared using the following method:

Test coin cells were made with negative electrodes comprising the silicon-based material prepared as described above. A dispersion of Carbon Super P (conductive carbon) and in CMC binder was mixed in a Thinky™ mixer. The silicon-based material was added to the mixture and mixed for 30 min in the Thinky™ mixer. SBR binder was then added to give a CMC:SBR ratio of 1:1, yielding a slurry with a weight ratio of silicon-based material:CMC/SBR:conductive carbon set out 70%: 16%: 14%. The slurry was further mixed for 30 min in the Thinky™ mixer, then was coated onto a 10 μm thick copper substrate (current collector) and dried at 50° C. for 10 minutes, followed by further drying at 110° C. for 12 hours to thereby form an electrode comprising an active layer on the copper substrate.

Example 4-Full Cell Manufacture and Cycling

Full coin cells were made using circular negative electrodes of 0.8 cm radius cut from the electrodes of Example 3 with a porous polyethylene separator and a nickel manganese cobalt (NMC532) positive electrode. The positive and negative electrodes were designed to form a balanced pair, such that the projected capacity ratio of the electrodes was around 0.9. An electrolyte comprising 1 M LiPF$_6$ in a 7:3 solution of EMC/FEC (ethylmethyl carbonate/fluoroethylene carbonate) containing 3 wt % vinylene carbonate was then added to the cell before sealing.

For each composite material, 3 coin cells were made.

The full coin cells were cycled as follows: A constant current was applied at a rate of C/25, to lithiate the anode, with a cut off voltage of 4.3 V. When the cut off was reached, a constant voltage of 4.3 V is applied until a cut off current of C/100 is reached. The cell was then rested for 10 minutes in the lithiated state. The anode is then delithiated at a constant current of C/25 with a cut off voltage of 2.75 V. The cell was then rested for 10 minutes. After this initial cycle, a constant current of C/2 was applied to lithiate the anode with a 4.3 V cut off voltage, followed by a 4.3 V constant voltage with a cut off current of C/40 with rest time of 5 minutes. The anode was then delithiated at a constant current of C/2 with a 2.75V cut off. This was then repeated for the desired number of cycles. The charge and discharge capacity was followed for up to 1000 cycles and the capacity retention at 100 and 300 cycles (CR100, CR300 and CR500) was determined for each sample. In the case of S2, CR1000 was also determined. This data is provided in Table 4 along with the 1st lithiation capacity, the 1st delithiation capacity and the first cycle loss (FCL) for each of the samples.

The charge (lithiation) and discharge (delithiation) capacities for each cycle are calculated per unit mass of the silicon-carbon composite material and the capacity retention value is calculated for each discharge capacity as a % of the discharge capacity on the second cycle. The first cycle loss (FCL) is $(1-(1^{st}$ delithiation capacity/$1^{st}$ lithiation capacity))×100%. The values in Table 4 are averaged over 3 coin cells for each sample.

From Table 4 below it can be demonstrated that the cells made with materials according to the invention have high initial capacity and consistent cycling performance and high capacity retention. The S2 material, with a lower content of coarse silicon (4.8 wt %), shows better capacity retention at high numbers of cycles than the S7 material, which has a higher content of coarse silicon (10.1 wt %).

TABLE 4

| Sample No. | 1st lith. mAh/g | 1st de-lith. mAh/g | FCL % | CR100 % | CR300 % | CR500 % | CR1000 % |
| --- | --- | --- | --- | --- | --- | --- | --- |
| S2 | 2052 | 1582 | 22.9 | 89 | 76 | 59 | 42 |
| S7 | 2079 | 1631 | 21.5 | 78 | 59 | 42 | — |

Example 5-Half Cell Manufacture

Coin half cells were made using circular electrodes of 0.8 cm radius cut from the electrode of Example 3 with a porous polyethylene separator, a lithium foil as the counter electrode and an electrolyte comprising 1M LiPF$_6$ in a FEC:EC:EMC 1:5:14 (fluoroethylene carbonate/ethylene carbonate/ethyl methyl carbonate, v/v/v) solution containing 3 wt % vinylene carbonate.

These half cells were used to measure the initial volumetric energy density (VED1), first cycle loss (FCL) and first delithiation capacity of the active layer. The relevant values are listed in Table 4. The half cells were tested by applying a constant current of C/25, (wherein "C" represents the specific capacity of the electrode in mAh, and "25" refers to 25 hours), to lithiate the electrode comprising the porous particles, with a cut off voltage of 10 mV. When the cut off is reached, a constant voltage of 10 mV is applied with a cut off current of C/100. The cell is then rested for 1 hour in the lithiated state. The electrode is then delithiated at a constant current of C/25 with a cut off voltage of 1V and the cell is then rested for 1 hour. A constant current of C/25 is then applied to lithiate the cell a second time with a 10 mV cut off voltage, followed by a 10 mV constant voltage with a cut off current of C/100. The values in Table 5 are averaged over 3 cells for each sample.

TABLE 5

| Sample No. | 1st lith. mAh/g | 1st de-lith. mAh/g | FCL % |
| --- | --- | --- | --- |
| S1 | 2154 ± 18 | 1789 ± 18 | 16.9 ± 0.2 |
| S2 | 2219 ± 19 | 1857 ± 15 | 16.3 ± 0.2 |

The invention claimed is:

1. A particulate material consisting of a plurality of composite particles, wherein the composite particles comprise:
   (a) a porous carbon framework comprising micropores and mesopores,
      wherein the micropores and mesopores have a total pore volume of $P^1$ cm$^3$/g, wherein $P^1$ represents a dimensionless number having a value of from 0.4 to 0.75, as measured by nitrogen gas adsorption at 77 K using quenched solid density functional theory (QSDFT) in accordance with ISO 15901-2 and ISO 15901-3, and
      wherein the micropore volume fraction is in the range of 0.5 to 0.85, based on the total volume of micropores and mesopores; and
   (b) a plurality of nanoscale elemental silicon domains located within the pores of the porous carbon framework;
   wherein the weight ratio of silicon to the porous carbon framework in the composite particles is in the range of from $[0.9 \times P^1$ to $1.9 \times P^1]$:1.

2. A particulate material according to claim 1, wherein the micropore volume fraction is in the range of 0.55 to 0.85 and wherein the weight ratio of silicon to the porous carbon framework in the composite particles is in the range of from $[0.9 \times P^1$ to $1.8 \times P^1]$: 1.

3. A particulate material according to claim 1, wherein $P^1$ has a value in the range from 0.42 to 0.72.

4. A particulate material according to claim 1, wherein the micropore volume fraction is in the range from 0.55 to 0.84.

5. A particulate material according to claim 1, wherein the having a PD$_{90}$ pore diameter of up to 20 nm.

6. A particulate material according to claim 1, wherein the weight ratio of silicon to carbon is in the range from $[1 \times P^1$ to $1.8 \times P^1]$: 1.

7. A particulate material according to claim 1, the porous carbon framework having an internal pore volume, wherein at least 80 wt % of the silicon in the composite particles is located within the internal pore volume of the porous carbon framework.

8. A particulate material according to claim 1, wherein the composite particles have one or more of:
   (i) a $D_{50}$ particle diameter in the range of 1 µm to 30 µm;
   (ii) a $D_{10}$ particle diameter of at least 0.5 µm;
   (iii) a $D_{90}$ particle diameter of up to 50 µm; and
   (iv) a particle size distribution span of 5 or less.

9. A particulate material according to claim 1, wherein the composite particles have a BET surface area of up to 100 m$^2$/g.

10. A particulate material according to claim 1, wherein the volume of micropores and mesopores of the composite particles, in the presence of the silicon, as measured by nitrogen gas adsorption, is up to $0.15 \times P^1$ cm$^3$/g.

11. A composition comprising a particulate material according to claim 1 and at least one other component.

12. A composition according to claim 11, the at least one other component comprising at least one of:
   (i) a binder; and
   (ii) one or more conductive additives.

13. A composition comprising at least 50 wt % of a particulate material according to claim 1, based on the total dry weight of the composition.

14. A composition comprising from 15 to 60 wt % of a particulate material according to claim 1, based on the total dry weight of the composition, and at least one additional particulate electroactive material.

15. A composition according to claim 14, wherein the at least one additional particulate electroactive material is selected from graphite, hard carbon, silicon, tin, germanium, aluminium and lead.

16. An electrode comprising a particulate material according to claim 1 in electrical contact with a current collector.

17. A rechargeable metal-ion battery comprising:
(i) an anode, wherein the anode comprises an electrode according to claim 16;
(ii) a cathode comprising a cathode active material capable of releasing and reabsorbing metal ions; and
(iii) an electrolyte between the anode and the cathode.

* * * * *